(12) United States Patent
Monk et al.

(10) Patent No.: US 9,736,119 B2
(45) Date of Patent: Aug. 15, 2017

(54) RELAY PROXY PROVIDING SECURE CONNECTIVITY IN A CONTROLLED NETWORK ENVIRONMENT

(71) Applicant: Google Inc., Mountain View, CA (US)

(72) Inventors: Jason Monk, Salem, MA (US); Geoffrey Allen Borggaard, Lincoln, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/247,179

(22) Filed: Apr. 7, 2014

(65) Prior Publication Data
US 2015/0288661 A1 Oct. 8, 2015

(51) Int. Cl.
*H04L 29/06* (2006.01)

(52) U.S. Cl.
CPC ........ *H04L 63/0281* (2013.01); *H04L 63/101* (2013.01); *H04L 63/08* (2013.01)

(58) Field of Classification Search
CPC ... H04L 63/08; H04L 63/083; H04L 63/0861; H04W 12/06; G06F 21/31
See application file for complete search history.

(56) References Cited

U.S. PATENT DOCUMENTS

| | | | |
|---|---|---|---|
| 6,606,663 B1* | 8/2003 | Liao | G06Q 20/20 705/25 |
| 8,392,972 B2* | 3/2013 | Manring | G06F 21/566 726/1 |
| 8,886,176 B2* | 11/2014 | Luna | H04W 12/06 455/422.1 |
| 8,973,112 B2* | 3/2015 | Golobay | H04L 63/20 726/1 |
| 9,009,250 B2* | 4/2015 | Luna | H04W 28/02 709/213 |
| 2004/0064727 A1* | 4/2004 | Yadav | H04L 63/0227 726/1 |
| 2005/0160140 A1* | 7/2005 | Kadyk | H04W 28/06 709/203 |

(Continued)

FOREIGN PATENT DOCUMENTS

EP 0993165 A2 * 4/2000 ............. H04L 29/06

OTHER PUBLICATIONS

PCT International Search Report and Written Opinion for PCT/US2015/021316, Jun. 10, 2015, 8 Pages.

*Primary Examiner* — Yonas Bayou
(74) *Attorney, Agent, or Firm* — Shumaker & Sieffert, P.A.

(57) ABSTRACT

A computer system for accessing remote content stored outside of a local network from within the local network comprises a relay proxy and a plurality of applications. The relay proxy receives a first request from a first application and a second request from a second application, the first and second requests identifying first and second remote content items respectively. The relay proxy forwards the first and second requests to a proxy server that manages network traffic entering and leaving the local network. The relay proxy receives responses to the first and second requests, with the response to the first request including the first remote content item and the response to the second request including the second remote content item. The relay proxy forwards the first and second remote content items to the first and second applications respectively.

21 Claims, 4 Drawing Sheets

(56) References Cited

U.S. PATENT DOCUMENTS

| | | | |
|---|---|---|---|
| 2012/0023190 A1* | 1/2012 | Backholm | H04W 4/18 709/217 |
| 2012/0179787 A1* | 7/2012 | Walsh | H04L 63/0281 709/219 |
| 2012/0246333 A1* | 9/2012 | Fiatal | H04L 12/587 709/231 |
| 2013/0091212 A1 | 4/2013 | Rajakarunanayake | |
| 2013/0311672 A1 | 11/2013 | Chastain | |
| 2013/0339724 A1* | 12/2013 | Amit | H04L 63/0272 713/151 |
| 2015/0047001 A1* | 2/2015 | Izumi | G06F 21/51 726/7 |

\* cited by examiner

RELAY PROXY PROVIDING SECURE CONNECTIVITY IN A CONTROLLED NETWORK ENVIRONMENT

BACKGROUND

1. Technical Field

The subject matter described herein relates generally to accessing content over a network, and in particular to using a relay proxy to facilitate access to networked content by multiple applications on a user device.

2. Background Information

Many organizations and institutions route communications that are incoming or outgoing from their own network via a Hyper Text Transfer Protocol (HTTP) proxy in order to monitor network traffic and enforce network security policies. A browser application executing on each computing device within the network connects to the proxy, which routes data packets to and from the browser as appropriate. As all incoming and outgoing data packets pass through the proxy, the proxy can monitor network communications and perform enforcement operations as required.

Most schools provide Internet access to their students via an HTTP proxy. Thus, all student web traffic passes through a single point of access, which can be monitored. Further, access to content that is considered undesirable using the browsers of the school's computing devices can be blocked by the HTTP proxy, preventing student access to such content.

Modern tablets and smartphones (e.g., those running the Android™ operating system) typically include multiple applications, many of which access remote resources via the Internet. This raises a number of challenges for organizations and institutions wishing to use a proxy to monitor network traffic and enforce network security policies.

Firstly, each application must be configured to communicate via the proxy. This is both time consuming to implement and problematic for enforcement. A network administrator cannot easily monitor whether every application of every device operating in the network is connecting to the Internet via a proxy. Thus, it is hard to detect devices that either accidentally or maliciously have applications installed that connect directly to the Internet, bypassing the proxy.

Secondly, many proxies require that a device connecting to the Internet provide authentication credentials. These credentials need to be accessible to every application that requires access to the Internet. This is both a security risk, as a malicious application may share the credentials with an unauthorized third party, and inefficient, as each application must access the credentials independently. This inefficiency is further heightened in environments (e.g., schools) where multiple users use the same device. In such a scenario, the devices must track which user credentials are currently being used by each application and ensure that a given user's credentials are not made available to another user.

SUMMARY

A computer system for accessing remote content stored outside of a local network from within the local network comprises a relay proxy and a plurality of applications. The relay proxy is configured to retrieve remote content items via a proxy server that manages network traffic entering and leaving the local network. The plurality of applications is communicatively connected to the relay proxy. Each application is configured to send a request for a remote content item to the relay proxy and receive the requested remote content item in response.

A method of accessing remote content stored outside a local network from within the local network includes receiving, at a relay proxy executing on a user device, a first request and a second request. The first request is received from a first application executing on the user device and the second request is received from a second application executing on the user device. The first request identifies a first remote content item and the second request identifies a second remote content item. The method also includes forwarding the first and second requests to a proxy server that manages network traffic entering and leaving the local network, and receiving responses to the first and second requests. The response to the first request includes the first remote content item and the response to the second request includes the second remote content item. The method further includes forwarding the first remote content item to the first application and the second remote content item to the second application.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
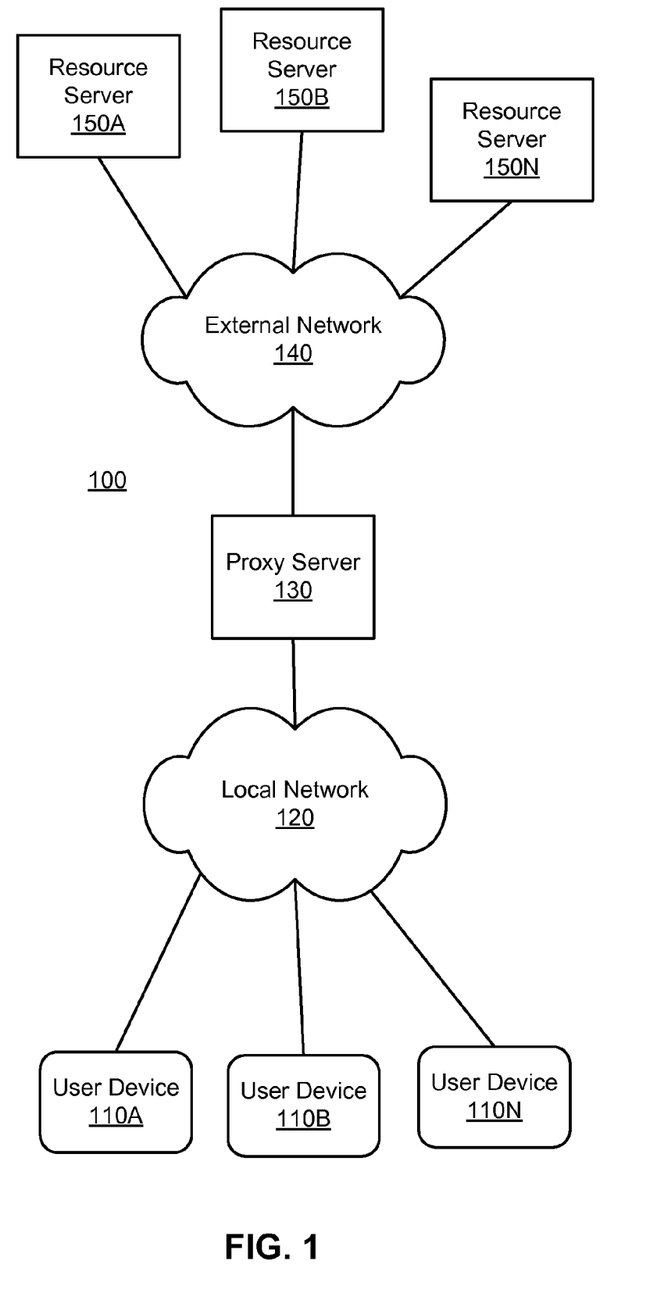
FIG. 1 is a high-level block diagram illustrating a networked computing environment in which a relay proxy may be used, according to one embodiment.

FIG. 1 is a high-level block diagram illustrating a networked computing environment 100 in which a relay proxy may be used, according to one embodiment. In the illustrated embodiment, the networked computing environment 100 includes a plurality of user devices 110A-N, a proxy server 130, and a plurality of resource servers 150A-N. The user devices 110 are connected to the proxy server 130 via a local network 120 and the proxy server is connected to the resource server 150 via an external network 140. In other embodiments, the networked computing environment 100 contains different and/or additional elements. In addition, the functions may be distributed among the elements in a different manner than described herein.

The local network 120 connects the user devices 110A-N to the proxy server 130. The local network 120 is typically a LAN or WAN maintained by an organization and may be wired, wireless, or a combination of both. The local network 120 connects user devices 110A-N (operated by users associated with the organization) to each other as well as the external network 140. The external network 140 is typically the Internet, but may be any network to which the organization wishes to monitor access or enforce a security policy. Although the identifiers "local" and "external" are used for the networks 120 and 140, this should not be taken as limiting in scope. In various embodiments the local network 120 is distributed across multiple geographic locations (e.g., an enterprise's Virtual Private Network) or the external network 140 is managed by the same organization as the local network 120. For example, in an educational setting, the external network 140 might provide a connection to a resource server 150 managed by a school, which only students enrolled in a certain class are permitted to access.

The resource servers 150A-N are computing devices such as webservers that host content that can be accessed via the external network 140 by other computing devices, such as the user devices 110A-N. Although only three resource servers 150 are shown, in practice there may be many (e.g., thousands or even millions of) resource servers accessible via the external network 140. For example, the Internet enables access to millions of resource servers 150 hosting websites, documents, and other computer-readable data.

The user devices 110A-N are computing devices such as smartphones, tablets, laptops, and desktop PCs that are connected to the local network 120 and can be used to access the networked content hosted on the resource servers 150. Although only three user devices 110 are shown, in practice there are many (e.g., tens or hundreds of) user devices connected to the local network 120 that can access remote content via the external network 140. For example, a school may own a set of thirty tablets that students use to access online educational content. Various embodiments of a user device 110 are described in greater detail below, with reference to FIG. 2.

The local network 120 is connected to the external network 140 via a proxy server 130. The proxy server 130 monitors network traffic between the local network 120 and the external network 140 and enforces security policies as required. In one embodiment, the proxy server 130 includes a firewall that blocks any network traffic that is not incoming or outgoing from a relay proxy of one of the user devices 110, as described in greater detail below with reference to FIG. 2. Thus, all of the network traffic between the user devices 110 and the external network 140 pass through the proxy server 130. Consequently, the proxy server 130 provides a single access point to the local network 120 at which the corresponding organization can monitor traffic and enforce security policies. For example, a school that provides tablets (user devices 110A-N) to students for use in the classroom can restrict access to just that remote content considered appropriate (a whitelist approach), block access to remote content considered inappropriate (a blacklist approach), or use a combination of both processes. Further, the school can monitor the incoming and outgoing network traffic from the tablets to ensure students are on-task or identify inappropriate content that is currently accessible but should be blocked.

Figure 2:
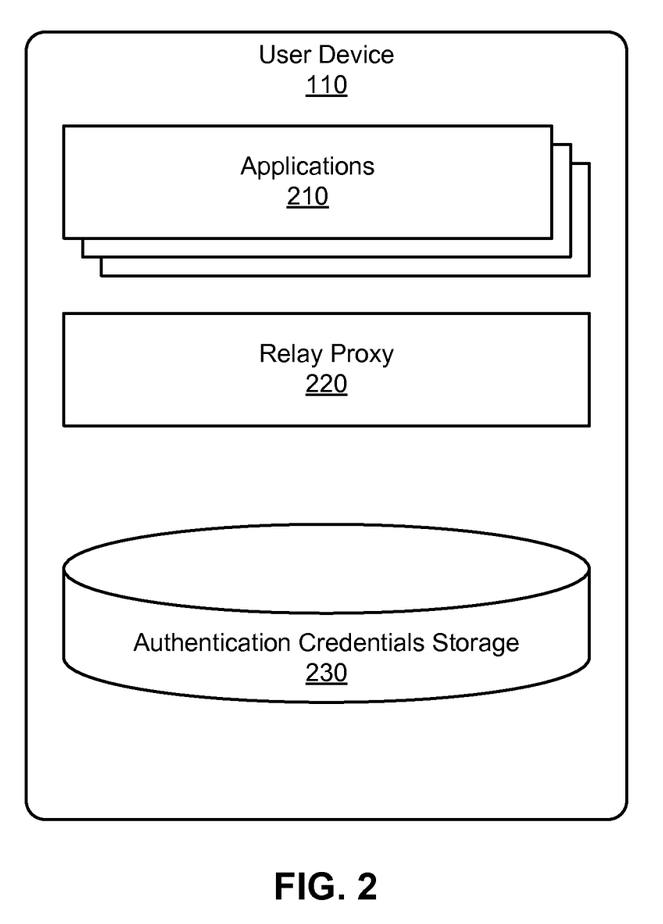
FIG. 2 is a high-level block diagram illustrating a user device suitable for use in the networked computing environment shown in FIG. 1, according to one embodiment.

FIG. 2 is a high-level block diagram illustrating a user device 110, according to one embodiment. In the illustrated embodiment the user device 110 includes a plurality of applications 210, a relay proxy 220, and authentication credentials storage 230. In other embodiments, the user device 110 contains different and/or additional elements. In addition, the functions may be distributed among the elements in a different manner than described herein.

The authentication credentials storage 230 comprises one or more non-transitory computer-readable media and is configured to store the authentication credentials for one or more users that use the user device 110. Various types of authentication credentials can be used, including username and password pairs, digital passports, tokens, and the like. In one embodiment, the authentication credentials are encrypted to prevent unauthorized use. In another embodiment, the user is prompted to provide authentication credentials periodically (e.g., once every hour) and the authentication credentials are stored in memory until the next prompt is provided, at which point the old credentials are wiped from memory. In this way, the user's authorization credentials are protected from unauthorized access by other users of the computing device.

The applications 210, when executed, provide functionality to a user of the user device 110. At least some of the applications 210 access remote content hosted by one or more of the resource servers 150A-N as part of the functionality they provide. For example, a web browser might attempt to access a celebrity gossip webpage hosted at a first resource server, while an educational application intended for use in high school geography class might attempt to retrieve weather data for a range of locations around the world from a second resource server 150B. In order to reduce the likelihood of students straying off-task in class, a school might wish to configure the proxy server 130 to allow the user device 110 to access the weather data but not the celebrity gossip website.

As described previously, using a conventional system configuration (without a relay proxy 220), it can be difficult to configure the proxy server 130 to correctly allow and block access to remote content. As the number of applications 210 installed on the mobile device 110 increases, the task of configuring the proxy server 130 becomes increasingly complex and subject to error. For example, in the Android™ operating system, each application maintains its own connection to the external network 140 and so the proxy server 130 has to be configured individually for each application from which remote content requests are expected. Further, in educational settings any given user device 110 is likely to be used by multiple students, and any given student is likely to use different ones of the user devices 110A-N at different times. Thus, the student's authentication credentials must be provided to each application 210 individually, further increasing the complexity of the system and increasing the likelihood of a breach of network security. These problems are addressed by the relay proxy 220. It should be noted that the term "relay proxy" is used herein to describe a component of the user device 110 that provides an access point to the local network 120 (and hence the remote network 140). This should not be confused with relay proxies such as those used as part of a DHCP relay that isolates the DHCP servers from clients and enables lease offers from multiple such servers to be obtained and the most desirable one selected. Where a DHCP relay receives lease requests from multiple user devices and distributes those requests to multiple DHCP servers, the relay proxy 220 is an application executing on a particular user device 110 that is configured to enable customization of the routing of network traffic between other applications 210 executing on the user device and a proxy server 130 that controls access to the external network 140 (e.g., the Internet). Unlike a DHCP proxy, which routes all lease requests the same, the relay proxy 220 can be configured to route communications from different sources differently. For example, a request to access the external network 140 received from an unknown or blocked (blacklisted) application might be ignored, or routed to a network administrator, rather than forwarded to the external network.

The relay proxy 220 executes on the user device 110 and provides a centralized mechanism by which applications 210 connect to the proxy server 130 (via the local network 120). When an application 210 requires access to a remote content item (e.g., a piece of content hosted on a resource server 150), the application sends a request identifying the content item to the relay proxy 220. In one embodiment, the request is a standard HTTP request.

The relay proxy 220 forwards the request to the proxy server 130, which in turn forwards the request to the appropriate resource server 150. Thus, from the perspective of the proxy server 130, the request comes from the relay proxy 220. Consequently, the proxy server 130 needs only to be configured to forward requests received from the relay proxy 220, and can be configured to block any requests received directly from applications 210.

In one embodiment, the proxy server 130 requires that a user's authentication credentials be provided whenever a connection to a remote resource server 150 is established. To address this, the relay proxy 220 monitors network traffic received from applications 210 and inserts the user's authentication credentials (e.g., as stored in the authentication credentials storage 230) as required. In one embodiment, if the relay proxy 220 identifies a connection request to a resource server 150 originating from one of the applications 210, the relay proxy adds the current user's authentication credentials to the request. Thus, rather than users being required to provide authentication credentials separately to each application, and dealing with the corresponding data-management overhead, a user can just sign in to the relay proxy 220 (e.g., by providing a username and password) and all applications 210 on the user device 110 will then operate using that user's credentials. In other embodiments, other methods are used to authenticate the identity of the user, including, but not limited to: fingerprint recognition, facial recognition, and digital signatures. Providing user authentication for a plurality of applications through a single application (e.g., the relay proxy 220) also improves the user experience, as users are not required to provide authentication credentials multiple times. This is particularly valuable in environments where multiple users share a single user device 110, such as schools.

Figure 3:
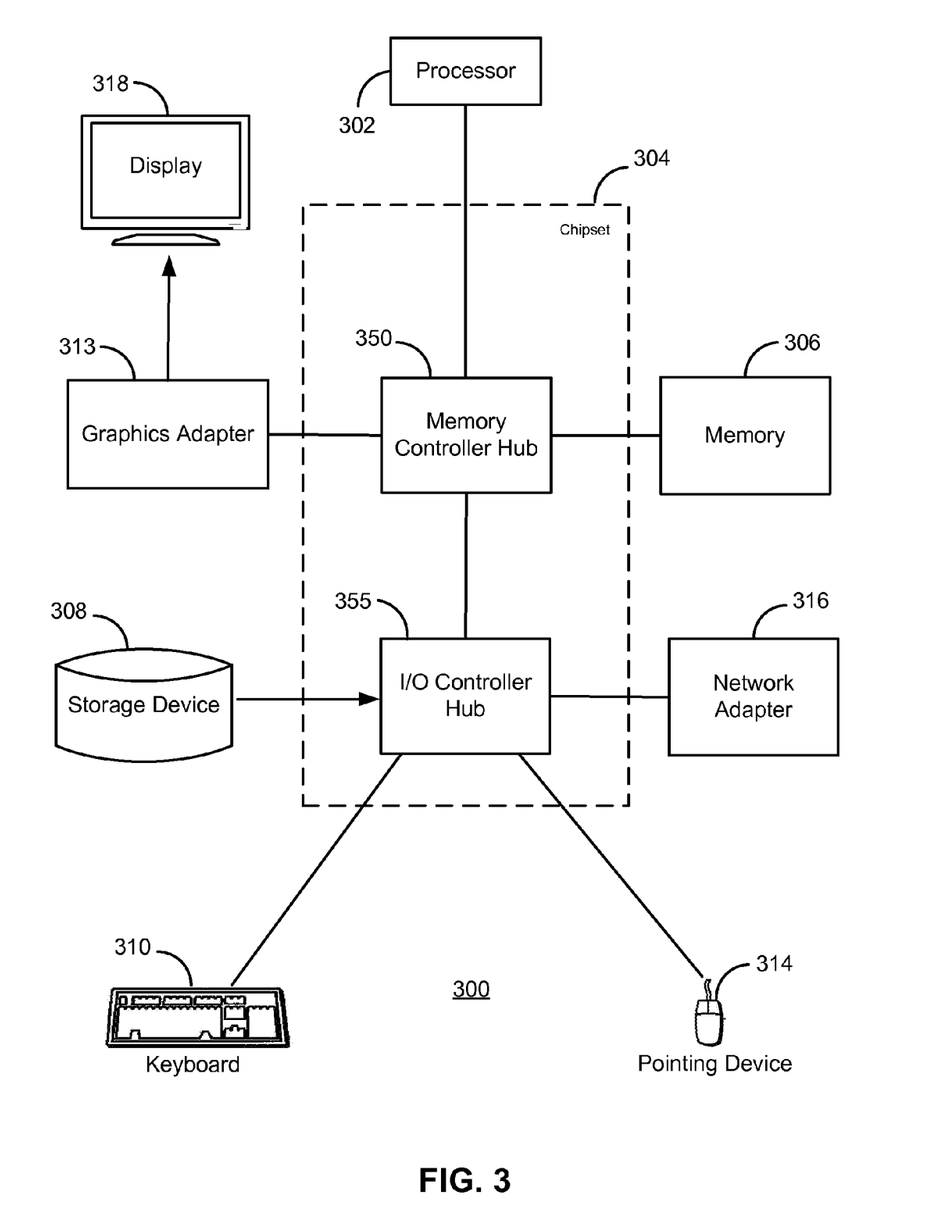
FIG. 3 illustrates a computer suitable for use as a user device, proxy server, or resource server shown in FIG. 1, according to one embodiment.

FIG. 3 is a high-level block diagram illustrating an example computer 300. The computer 300 includes at least one processor 302 coupled to a chipset 304. The chipset 304 includes a memory controller hub 320 and an input/output (I/O) controller hub 322. A memory 306 and a graphics adapter 312 are coupled to the memory controller hub 320, and a display 318 is coupled to the graphics adapter 312. A storage device 308, keyboard 310, pointing device 314, and network adapter 316 are coupled to the I/O controller hub 322. Other embodiments of the computer 300 have different architectures.

The storage device 308 includes one or more non-transitory computer-readable storage media such as hard drives, compact disk read-only memories (CD-ROM), DVDs, or solid-state memory devices. The memory 306 holds instructions and data used by the processor 302. The pointing device 314 is a mouse, track ball, or other type of pointing device, and is used in combination with the keyboard 310 to input data into the computer system 300. The graphics adapter 312 displays images and other information on the display 318. The network adapter 316 couples the computer system 300 to one or more computer networks, such as networks 120 and 140.

The computer 300 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 308, loaded into the memory 306, and executed by the processor 302.

The types of computers used by the entities of FIGS. 1 and 2 can vary depending upon the embodiment and the processing power required by the entity. For example, a resource server 150 might comprise multiple servers working together to provide the functionality described herein, whereas a user device 110 might be a tablet computing device. The computers can lack some of the components described above, such as keyboards 310, graphics adapters 312, and displays 318, depending on the specific functionality they provide within the networked computing environment 100.

Figure 4:
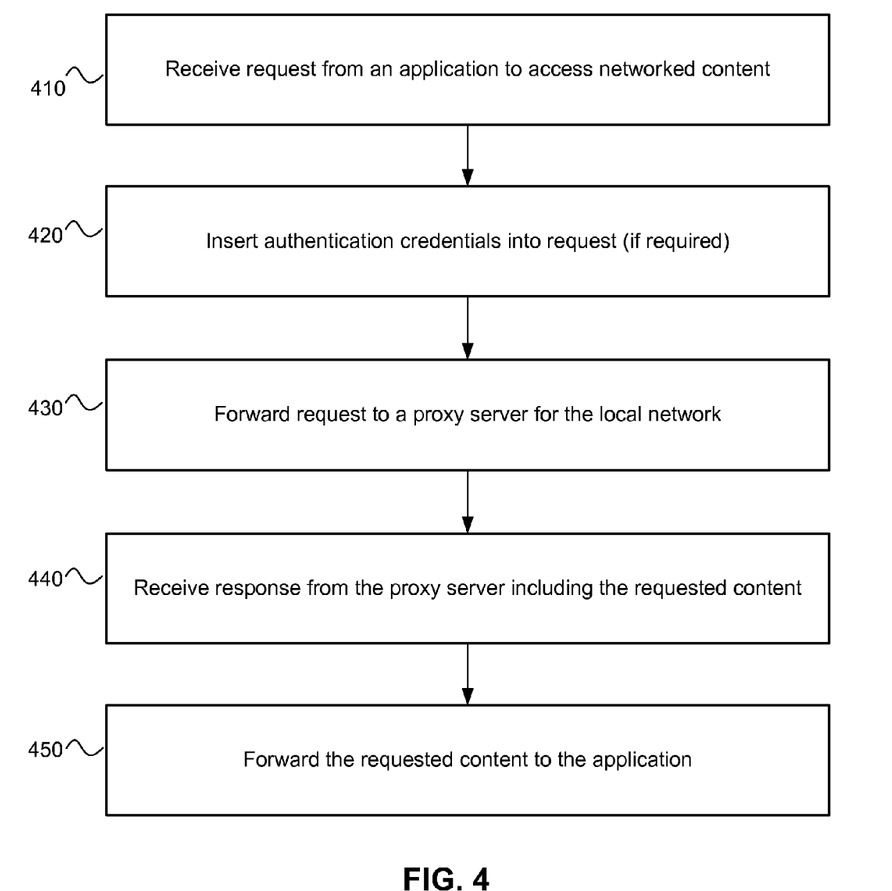
FIG. 4 is a flow chart illustrating a method by which a relay proxy manages network traffic between an application and a remote resource server, according to one embodiment.

FIG. 4 illustrates a method by which a relay proxy 220 manages network traffic between an application 210 and a remote resource server 150, according to one embodiment. The steps of FIG. 4 are illustrated from the perspective of the relay proxy 220 performing the method. However, some or all of the steps may be performed by other entities and/or components. In addition, some embodiments may perform the steps in parallel, perform the steps in different orders, or perform different steps.

The method begins with the relay proxy 220 receiving 410 a request to access an item of networked content (e.g., content hosted on a resource server 150) from an application 210. In one embodiment the request identifies a particular resource server 150 and includes a content identifier that uniquely identifies the requested content within the networked computing environment 100.

The relay proxy 220 inserts 430 authentication credentials into the request if required. In one embodiment, the relay proxy examines the request to determine whether authentication credentials are required. For example, if a connection is already active between the originating application 110 and the hosting resource server 150, authentication credentials might not need to be provided, depending in the configuration of the proxy server 130. If authentication credentials need to be inserted 430, the relay proxy 220 retrieves the required credentials from authentication credentials storage 230 and adds them to the request. In one embodiment, the relay proxy 220 initially sends the request without inserting 430 authentication credentials. If authentication credentials are required for the request, the proxy server 130 will reject the request and the relay proxy 220 will receive an authentication failed notification. In response, the relay proxy 220 inserts 430 the required authentication credentials and resends the request.

The relay proxy 220 forwards 430 the request (including any required authentication credentials) to the proxy server 130 for the local network. As the request received by the proxy server 130 originated from the relay proxy 220, it contains the required authentication headers. Therefore, the proxy server 130 processes the request and retrieves the required content from the hosting resource server 150. In contrast, if an application 210 sends the request directly to the proxy server 230 the request will lack the required authorization headers. Thus, the proxy server identifies the request as having come from an unauthorized source, and prevents the request from leaving the local network 120.

The relay proxy 220 receives 440 a response from the proxy server 130 that includes the requested content that was retrieved from the resource server 150. The relay proxy 220 then forwards 450 the requested content item to the application 210 from which the request to access the content originated. The requested content can then be used by the application 210 to provide functionality to the end-user. For example, an educational quiz application might retrieve a set of high scores for a particular region (e.g., a school district, a country, worldwide, etc.) and present them on a display of the user device 110 in conjunction with the user's own score. As another example, a video player application may present video content on the display of the user device 110.

Using the systems and methods described above, an organization such as a school can efficiently monitor network traffic in and out of the organization's local network 120. Further, the organization can enforce network security policies such as limiting student Internet access to certain approved websites. By using a relay proxy 220 installed on user devices 110, local network's proxy server 130 can be configured to allow only network traffic to and from a relay proxy to cross the boundary between the local network 120 and the external network 140. Thus, configuration of the local network's proxy server 130 is significantly simpler than a configuration where each application 110 accesses the external network 140 directly (i.e., not via a relay proxy 220). Further, because the network traffic to and from applications is routed via the relay proxy 220, the individual applications 210 need not have access to users' authentication credentials. Thus, the security of the local network 120 and the users is protected against a malicious or poorly designed application 210 leaking authentication credentials to an unauthorized party.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for providing secure and enforceable network connectivity using a relay proxy. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein. The scope of the invention is to be limited only by the following claims.

What is claimed is:

1. A user device for accessing remote content stored outside a network from within the network, the user device comprising:
   a relay proxy, the relay proxy configured to:
      receive sign in information associated with a user,
      retrieve remote content items via a proxy server, the proxy server separate from the user device, the proxy server managing network traffic entering and leaving the network,
      examine requests from a plurality of applications for the remote content items to determine whether required authentication credentials are present,
      identify authentication credentials based on the sign in information, and
      automatically insert the authentication credentials in the requests responsive to determining that the authentication credentials are required to retrieve the remote content items; and
   the plurality of applications, each being communicatively connected to the relay proxy and each further configured to send a request for a remote content item to the relay proxy and retrieve the remote content item therefrom.

2. The user device of claim 1, wherein the proxy server is configured to process content requests received from the relay proxy and block content requests received directly from the plurality of applications.

3. The user device of claim 1, wherein the relay proxy is further configured to periodically provide a prompt to the user to supply the sign in information.

4. The user device of claim 1, wherein the relay proxy is configured to block a particular request for an unauthorized remote content item responsive to an indication that accessing the unauthorized remote content item from within the network is not permitted.

5. The user device of claim 4, wherein the indication comprises a resource server that hosts the remote content item appearing on a blacklist, the blacklist identifying resource servers to which access is not permitted from within the network.

6. The user device of claim 4, wherein the indication comprises a resource server that hosts the remote content item not being included on a whitelist, the whitelist identifying resource servers to which access is permitted from within the network.

7. The user device of claim 1, wherein the requests from the plurality of applications for the remote content items are examined after receiving the sign in information.

8. The user device of claim 1,
wherein the relay proxy is further configured to determine, based on the sign in information, the user from a plurality of users, and
wherein identifying the authentication credentials includes selecting the authentication credentials corresponding to the determined user.

9. A method of accessing remote content stored outside a network from within the network, the method comprising:
receiving sign in information associated with a user;
receiving, at a relay proxy executing on a user device, a first request from a first application executing on the user device and a second request from a second application executing on the user device, the first request identifying a first remote content item and the second request identifying a second remote content item;
examining the first request from the first application and the second request from the second application to determine whether required authentication credentials are present to retrieve the first remote content item and the second remote content item;
identifying authentication credentials based on the sign in information;
automatically inserting the authentication credentials into one of the first request and the second request lacking the authentication credentials;
forwarding the first request and the second request to a proxy server that manages network traffic entering and leaving the network, the proxy server separate from the user device;
receiving a first response to the first request and a second response to the second request, the first response including the first remote content item and the second response including the second remote content item; and
forwarding the first remote content item to the first application and the second remote content item to the second application.

10. The method of claim 9, wherein the proxy server is configured to process content requests received from the relay proxy and block content requests received directly from the first or second application.

11. The method of claim 9, further comprising:
periodically providing a prompt to the user to supply the sign in information.

12. The method of claim 9, further comprising:
receiving a third request from a third application installed on the user device, the third request identifying a third remote content item;
blocking the third request; and
sending a notification to the third application that the third request has been blocked.

13. The method of claim 12, wherein the relay proxy blocks the third request responsive to a resource server that hosts the third remote content item appearing on a blacklist, the blacklist identifying resource servers to which access is not permitted from within the network.

14. The method of claim 12, wherein the relay proxy blocks the third request responsive to the third remote content item not being included on a whitelist, the whitelist identifying content items to which access is permitted from within the network.

15. The method of claim 9, wherein the first request from the first application and the second request from the second application are examined after receiving the sign in information.

16. A non-transitory computer-readable medium storing executable computer program code for accessing remote content stored outside a network from within the network, the computer program code comprising instructions for:
receiving sign in information associated with a user;
receiving, at a relay proxy executing on a user device, a first request from a first application executing on the user device and a second request from a second application executing on the user device, the first request identifying a first remote content item and the second request identifying a second remote content item;
examining the first request from the first application and the second request from the second application to determine whether required authentication credentials are present to retrieve the first remote content item and the second remote content item;
identifying authentication credentials based on the sign in information;
automatically inserting the authentication credentials into one of the first request and the second request lacking the authentication credentials;
forwarding the first request to be delivered to a first resource server through a proxy server, the first resource server hosting the first remote content item, the proxy server managing network traffic entering and leaving the network, the proxy server separate from the user device;
forwarding the second request to be delivered to a second resource server through the proxy server, the second resource server hosting the second remote content item;
receiving a first response to the first request and a second response to the second request, the first response including the first remote content item and the second response including the second remote content item; and
providing the first remote content item to the first application and the second remote content item to the second application.

17. The non-transitory computer-readable medium of claim 16, wherein the computer program code further comprises instructions for:
periodically providing a prompt to the user to supply the sign in information.

18. The non-transitory computer-readable medium of claim 16, wherein the computer program code further comprises instructions for:
receiving a third request from a third application installed on the user device, the third request identifying a third remote content item;
blocking the third request; and
sending a notification to the third application that the third request has been blocked.

19. The non-transitory computer-readable medium of claim 18, wherein the relay proxy blocks the third request responsive to a resource server that hosts the third remote content item appearing on a blacklist, the blacklist identifying resource servers to which access is not permitted from within the network.

20. The non-transitory computer-readable medium of claim 18, wherein the relay proxy blocks the third request responsive to the third remote content item not being included on a whitelist, the whitelist identifying content items to which access is permitted from within the network.

21. The non-transitory computer-readable medium of claim 16, wherein the first request from the first application and the second request from the second application are examined after receiving the sign in information.

\* \* \* \* \*